United States Patent [19]

Shirai et al.

[11] Patent Number: 4,662,915
[45] Date of Patent: May 5, 1987

[54] POWDER-AIR SEPARATOR FOR USE IN A POWDER FILLING APPARATUS

[75] Inventors: Norio Shirai, Ibaraki; Jotaro Kishimoto, Nishinomiya; Yukihide Noguchi, Kishiwada; Hideomi Ishibe, Soraku; Kiyoshi Nagai, Johyoh, all of Japan

[73] Assignees: Takeda Chemical Industries, Ltd.; Nippon Seisen Co., Ltd., both of Osaka, Japan

[21] Appl. No.: 753,615

[22] Filed: Jul. 9, 1985

[30] Foreign Application Priority Data

Jul. 9, 1984 [JP] Japan .............................. 59-142889
Jun. 14, 1985 [JP] Japan .............................. 60-130323

[51] Int. Cl.⁴ .............................................. B65B 1/16
[52] U.S. Cl. ................................... 55/511; 55/523; 222/636
[58] Field of Search ............... 55/523, 511; 222/189, 222/636, 637

[56] References Cited

U.S. PATENT DOCUMENTS

| 3,656,518 | 4/1972 | Aronson | 222/636 X |
| 4,264,346 | 4/1981 | Mann | 55/523 |
| 4,371,101 | 2/1983 | Cane et al. | 222/636 |
| 4,560,478 | 12/1985 | Narumiya | 55/523 |

FOREIGN PATENT DOCUMENTS

| 87067 | 8/1983 | European Pat. Off. | 55/523 |
| 142820 | 8/1984 | Japan | 55/523 |

Primary Examiner—Stephen Marcus
Assistant Examiner—Mark Thronson
Attorney, Agent, or Firm—Wenderoth, Lind & Ponack

[57] ABSTRACT

A powder-air separator with a filter made by sintering short-cut filament-shaped particles or by sintering a mixture of short-cut filament-shaped particles and ordinary atomized round particles.

6 Claims, 32 Drawing Figures

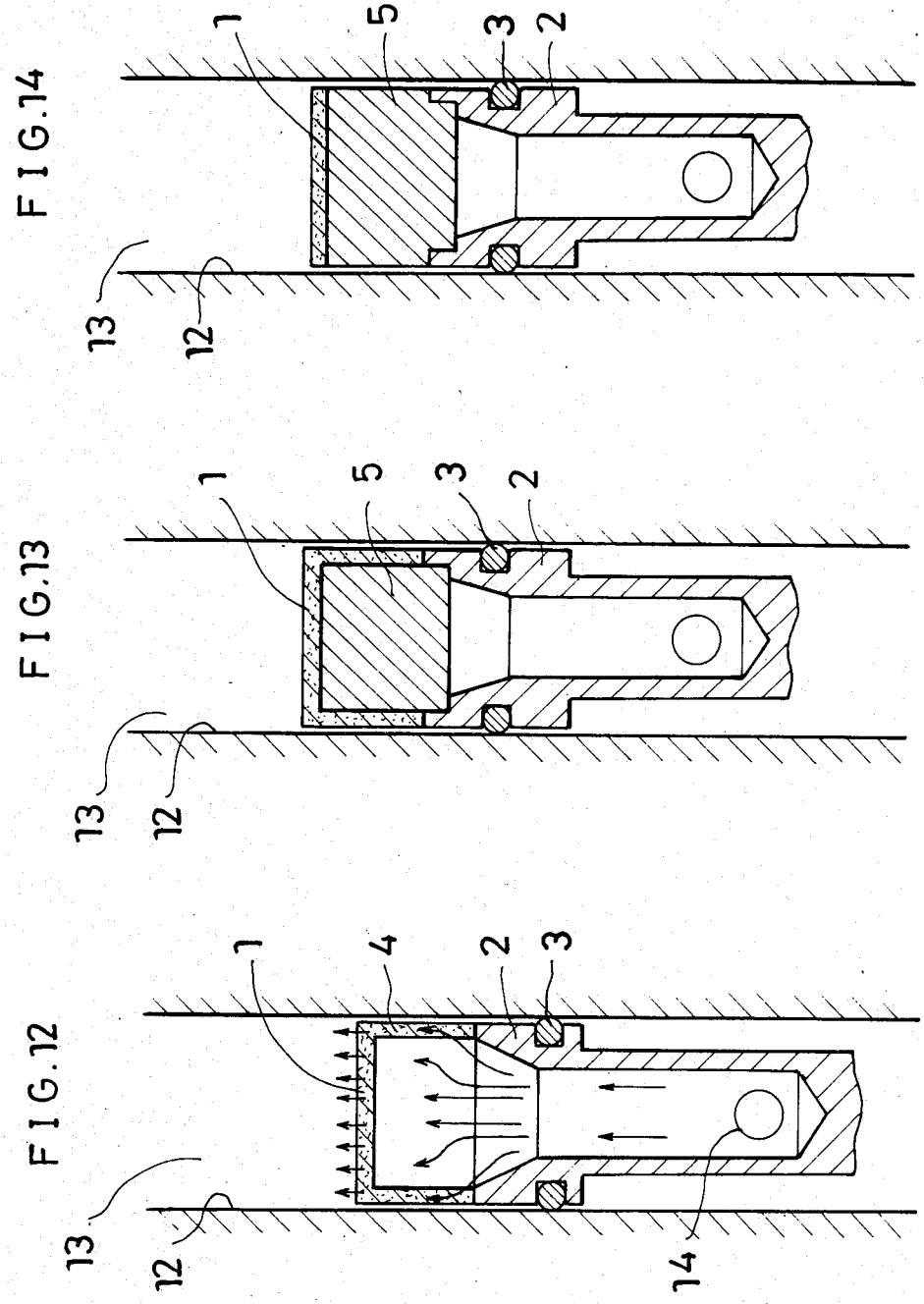

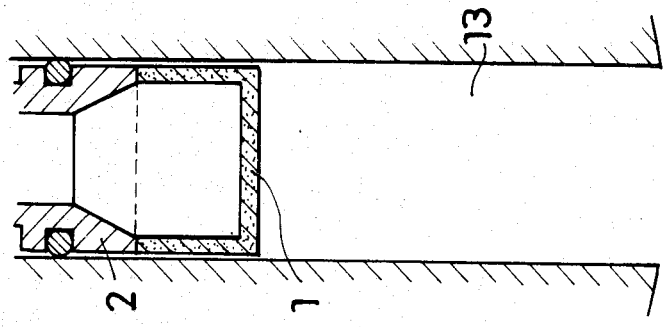 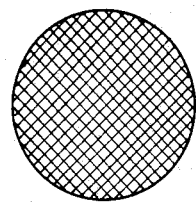
FIG.12A
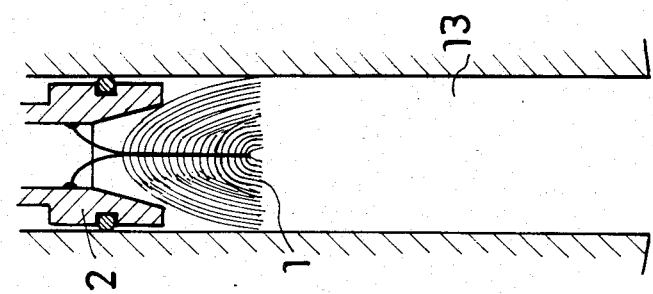 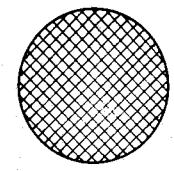
FIG.23A prior art
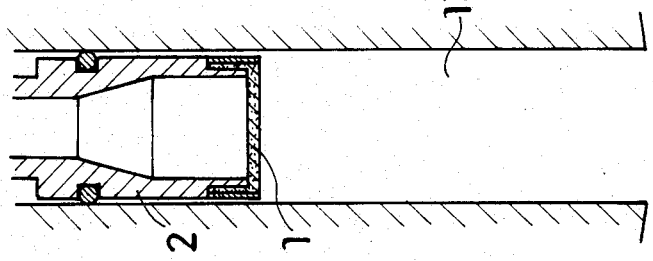 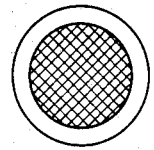
FIG.24A prior art
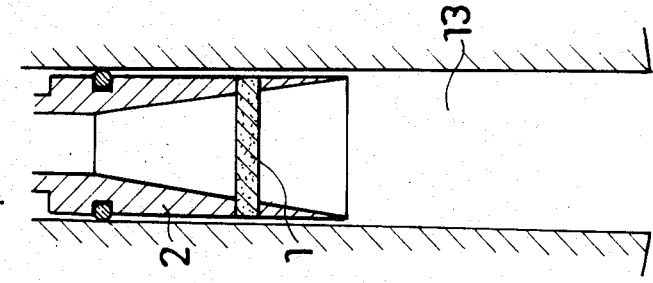 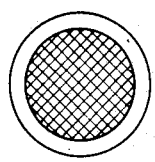
FIG.25A prior art
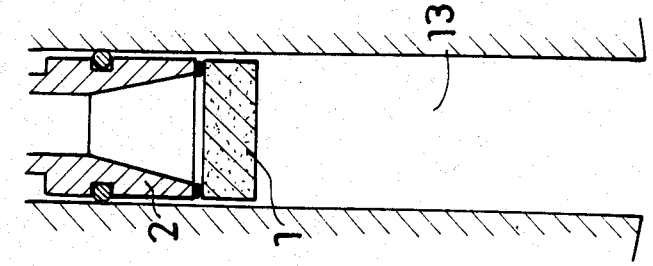 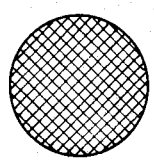
FIG.26A prior art

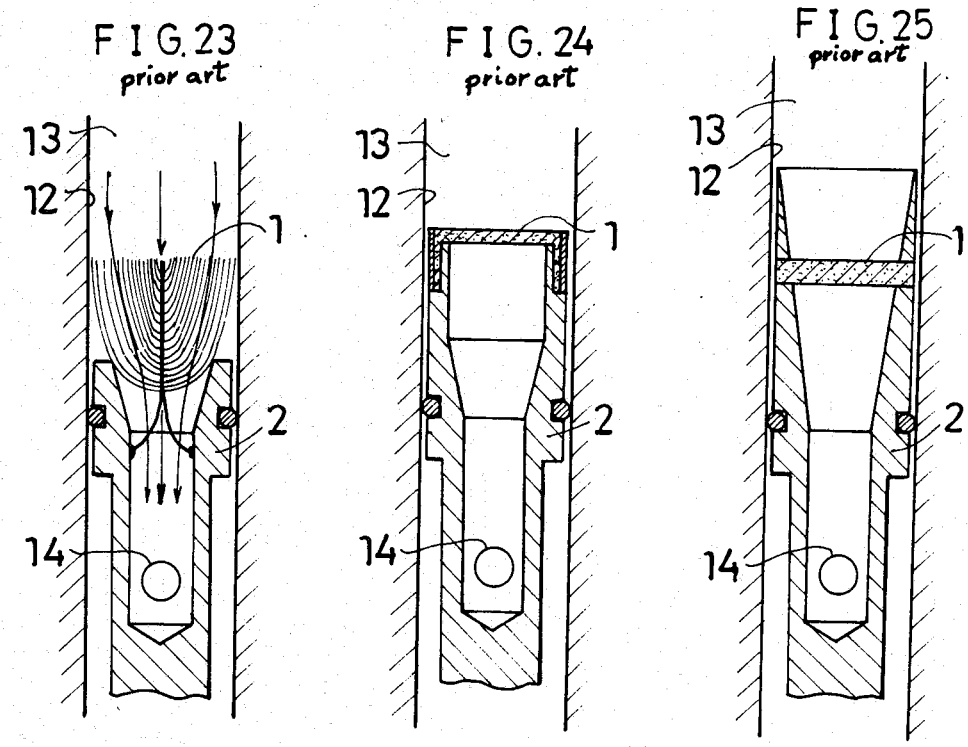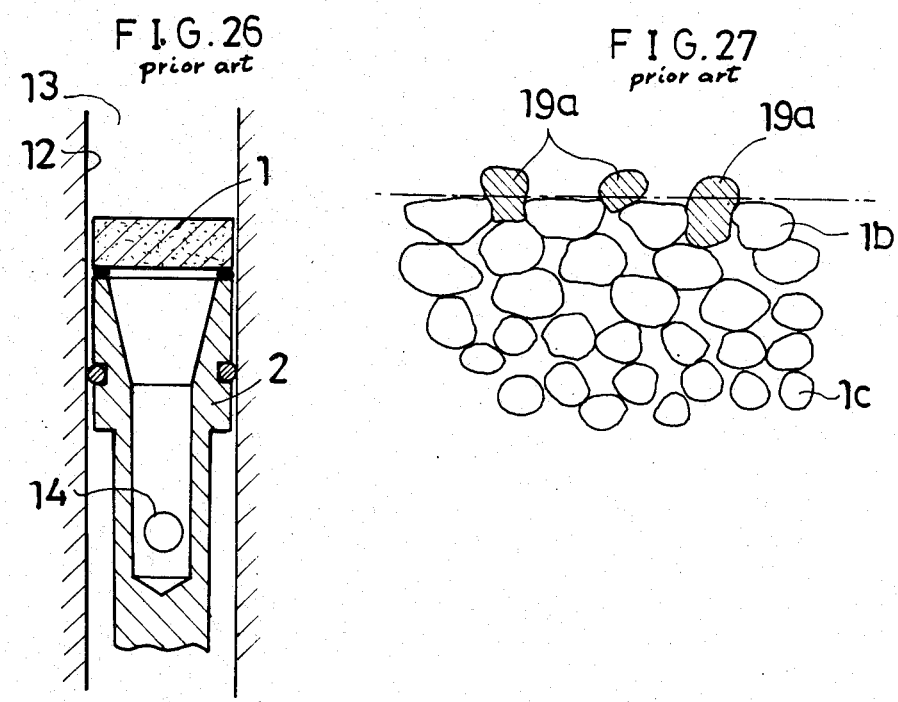

POWDER-AIR SEPARATOR FOR USE IN A POWDER FILLING APPARATUS

BACKGROUND OF THE INVENTION

1. Field of the Invention

The present invention relates to a powder-air separator for use in an apparatus for measuring out a predetermined quantity of powder into a vessel by first inhaling powder from a powder containing hopper into a powder quantity measuring chamber provided in the apparatus and then exhaling the powder from the chamber into a vessel to be charged with the powder.

2. Prior Art

In advance of describing prior art powder-air separators, a general constitution and performance of a powder filling apparatus in which powder-air separators are used is briefly described.

A typical powder filling apparatus which is used, for instance, in the pharmaceutical industry for measuring out a predetermined quantity of a powdered medicine into a vessel is illustrated in FIGS. 21 and 22. FIG. 21 shows the partially cut-out frontal view of the apparatus together with accompanying equipment, and FIG. 22 is the vertical cross-sectional view of the apparatus. According to the figures the apparatus comprises a vertically installed turret 11 provided with a plurality of powder quantity measuring chambers 13. Each of the chambers 13 is defined by a cylindrical hole 12 and a filter 1 attached on top of a filter carrier 2 inserted slidably in the hole 12. The filter carrier 2 has its tail 2a geared to a not shown mechanism for moving the same in the cylindrical hole 12 within a predetermined range. The volume of the chamber 13 can therefore be determined by a set position of the filter 1. The filter carrier 2 is made hollow under the filter 1, while the cylindrical hole 12 has its wall provided with an orifice 14 so that it may put in appearance at the hollow of the filter carrier 2. The orifice 14 is made to be selectively connected with a vacuum source 16 (FIG. 21) or a compressed air source 17 (FIG. 21) by means of a suitable air-vacuum switching means (not shown in the figures). On the upside of the turret 11, a hopper 18 (FIG. 21) which stores powder 19 is provided with its open bottom kept in contact with the circumference of the turret 11. In such an arrangement of the apparatus and related equipment, the turret 11 is intermittently rotated through a shaft 15 (FIG. 22) so that the powder quantity measuring chambers 13 may successively be brought under the hopper 18. Each time one powder quantity measuring chamber comes under the hopper 18, the orifice 14 related to that chamber is made to communicate with the vacuum source 16 to inhale the powder 19 into the chamber from the hopper 18. The chamber which once inhaled the powder remains connected to the vacuum source 16 through the orifice 14, lest the powder (should) be spilt out, until the chamber is brought, upside down, to the lowest position just above a vessel 20 (FIG. 21) waiting to be charged with the powder under the turret 11. With the opening of the chamber kept above the vessel, the orifice connection is switched to the compressed-air source 17 to exhale the powder into the vessel 20 in the form of a lump. In the above apparatus the filter 1 and the filter carrier 2 constitute a powder-air separator, which the present invention aims at improving.

In the following, some of the powder-air separators based on a prior art are shown in FIGS. 23, 24, 25 and 26, as being inserted in the above cylindrical hole 12.

The filter 1 of the powder-air separator shown in FIG. 23 is made up of bundled wires. This type of filter not only has its pore cross-sections distributed widely but also has its pores themselves made long and deep nearly along the directions of powder inhaling air streams, as indicated with arrows, so that smaller inhaled powder particles are liable to clog the filter, and what is unfavorable, in deep places. The clogging of the filter adversely affects both the powder inhaling and the powder exhaling performances of the powder-air separator.

In the other separators shown in FIGS. 24, 25 and 26, the filters 1 are all made by sintering substantially spherical metallic-particles, namely, made of an ordinary sintered metallic plate. The filters of this kind, however, have their porosity made relatively small, and therefore a higher pressure difference is needed for inhaling and exhaling powder. In addition, the pores made in the surface region are often bunt-shaped with their pore-openings made smaller than the inside cross-sections, as is schematically shown in FIG. 27, because the metallic particles 1b in the surface region are more strongly squeezed by a sintering pressure than those 1c located deep in the filter.

Accordingly, the powder particles once trapped in the surface pores are difficult to expel when the powder is exhaled. This causes the filter to be easily clogged. In FIG. 27, a reference number 19a shows trapped powder particles. Further, the conventional air-powder separators excluding the one which uses the filter shown in FIG. 23 have a dead space for sir streams on a marginal region of the filter, where the filter is attached to the filter carrier. The dead space, together with the clogging of the filter, causes detorioration of the performance of the separator, particularly the powder exhaling performance.

OBJECTS AND SUMMARY OF THE INVENTION

An object of the present invention is to provide a powder-air separator substantially free from being clogged by powder particles when used in such a powder filling apparatus as described above in reference to FIGS. 21 and 22, even for powder containing particles smaller than 5 μm.

Another object of the present invention is to constitute such a powder-air separator so that air may penetrate the there employed filter through its whole area, leaving no dead space on the marginal region of the same.

A further object of the present invention is to provide a powder-air separator not only resistive against acids, alkalines and other chemical substances but also stable for sterlization treatments at high temperatures.

For the achievement of these objects, the filter employed in the powder-air separator based on the present invention is made either by sintering only short-cut filament-shaped particles with filament diameters not larger than 30 μm and aspect ratios of 2 to 50, or by sintering such short-cut filaments mixed with ordinary round particles having diameters not larger than 500 μm. The mixing ratio of the filament-shaped particles in the mixture is preferably 10 weight-% at least. The particle dimensions and particle mixing ratio were determined from the experiments carried out by the inventors in search of the most favorable sintered filter (for use in a powder filling apparatus) that should have a porosity not smaller than 30%, pore dimensions not larger than 5 μm and an initial bubble point pressure not lower than 1200 mm-H$_2$O. As the substances of particles to be sintered, such heat-resistant materials as metallic, ceramic and glass powders can be used. According to the experiments by the inventors, the filament-shaped particles with filament diameters exceeding 30 μm unfavorably result in a decrease in the porosity of the filter obtained by sintering such (filament-shaped) particles, while the filament-shaped particles having an aspect ratio smaller than 2 cause the pore dimensions to be distributed widely.

BRIEF DESCRIPTION OF THE DRAWINGS

The details of the present invention will be described later in reference to the accompanying drawings, in which:

FIGS. 2 to 7 and 11 to 14 show various embodiments of the present invention, all as being inserted in said cylindrical hole;

FIGS. 23 to 26 show prior art powder-air separators;

FIG. 27 shows an enlarged cross-sectional view of a prior art filter; and

FIGS. 12A and 23A to 26A are partial views of the powder-air separators shown in FIGS. 12 ahd 23 to 26, respectively.

DETAILED DESCRIPTION OF THE INVENTION

The powder-air separator based on the present invention is to be used in such a powder filling apparatus as was described above in Prior Art in reference of FIGS. 21 and 22. The general operation and performance of the powder filling apparatus is not repeated here.

Figure 1:
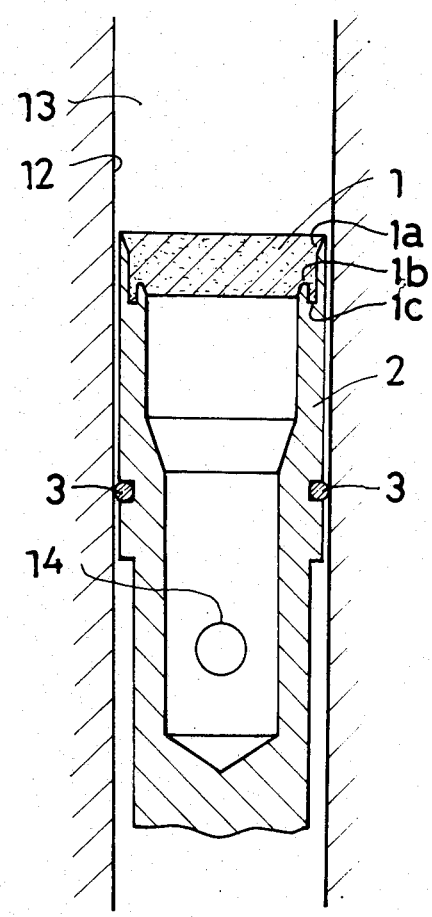
FIG. 1 shows a cross-sectional view of the most preferably embodied powder-air separator based on the present invention, as being inserted in a cylindrical hole of the powder filling apparatus shown in FIGS. 21 and 22.

FIG. 1 shows a cross-sectional view of one of the most preferably embodied powder-air separators based on the present invention, as being inserted in a cylindrical hole 12 of the powder filling apparatus (described in reference to FIGS. 21 and 22) to form a powder quantity measuring chamber 13. Referring to FIG. 1 the powder-air separator consists of a filter 1 and a filter carrier 2, the former being fixed to the latter on the top. The filter carrier 2, which has an O-ring 3 fixed around, is made hollow under the filter 1, where an orifice 14 provided on the wall of said cylindrical hole 12 puts in appearance so that a vacuum or compressed air may be introduced to the hollow of the filter carrier 2 through the orifice 14. The powder-air separators of the present invention, as represented by the one shown in FIG. 1, may seemingly be similar to some of the prior art powder-air separators. (Refer to FIGS. 24, 25 and 26.) However, the present invention is substantially different in the constitution of the filter and in the manner of fixing the filter to the filter positioner carrier. The details are described in the following.

In the embodiment shown in FIG. 1, the filter 1 made by sintering only short-cut stainless steel filament-shaped particles with an average filament diameter of 4 μm, 8 μm or 12 μm, or by sintering a mixture of short-cut stainless steel filament-shaped particles of 4 μm in filament diameter and atomized stainless steel round particles sized under 300-mesh, mixed at a weight ratio of 3:1. The aspect ratios of the above filament-shaped particles range from 4 to 8. Sintering was carried out with pressure-molded particles kept at a temperature not lower than 1000° C. in an inactive gas for several hours, while a pressure not lower than 150 Kg/cm$^2$ was used for molding the particles.

The technical data obtained by the inventors on the filters made of the above particles are shown in Table 1. For comparison the table contains the data of a prior art sintered filter made only of atomized round particles sized under 300-mesh. In the table, P$_0$ means the initial bubble point pressure, while P$_1$ indicates the point where the largest and the smallest gradients on a curve of pressure versus air flow rate intersect each other. The nearer unity the ratio P$_1$/P$_0$ gets, the more uniformly the pore dimensions are distributed. As is understood from Table 1, the filters made of filament-shaped particles and those made of a mixture of filament-shaped particles and ordinary atomized (round) particles have their porosities and bubble point pressures made larger and higher than the filters made only of atomized particles. This means that the filters made by sintering the particles containing filament-shaped ones have their pore dimensions made smaller and distributed more uniformly.

Further, a practical powder filling test was carried out by employing the four kinds of filters A, B, C and D shown in Table 2 in powder-air separators having the same construction as shown in FIG. 1.

TABLE 1

| Type of particles | | Molding pressure (kg/cm$^2$) | Porosity (%) | Bubble point pressure (mm-H$_2$O) | | P$_1$/P$_0$ | Strength (kg/cm$^2$) |
| --- | --- | --- | --- | --- | --- | --- | --- |
| | | | | Initial (P$_0$) | Cross point (P$_1$) | | |
| Sintered Filters Used | Filaments (dia = 4 μm) | 150 | 51.5 | 1687 | 1980 | 1.17 | |
| | | 500 | 43.5 | 2039 | 2770 | 1.36 | 45 |

TABLE 1-continued

| Type of particles | | Molding pressure (kg/cm²) | Porosity (%) | Bubble point pressure (mm-H₂O) | | $P_1/P_0$ | Strength (kg/cm²) |
|---|---|---|---|---|---|---|---|
| | | | | Initial ($P_0$) | Cross point ($P_1$) | | |
| | L/D = 6~8 | 1000 | 37.5 | 2353 | 3440 | 1.46 | |
| | Filaments | 150 | 47.5 | 1351 | 1790 | 1.32 | |
| | { dia = 8 μm } | 500 | 41.5 | 1677 | 2240 | 1.34 | 44 |
| | L/D = 5~7 | 1000 | 35.4 | 1881 | 2640 | 1.40 | |
| | Filaments | 150 | 48.8 | 1197 | 1500 | 1.25 | |
| | { dia = 12 μm } | 500 | 41.7 | 1360 | 1730 | 1.27 | 42 |
| | L/D = 4~6 | 1000 | 35.9 | 1537 | 1990 | 1.29 | |
| | Mixture of Filaments | 150 | 49.4 | 1346 | 1683 | 1.25 | |
| | { dia = 4 μm } | | | | | | |
| | { L/D = 6~8 } | | | | | | |
| | and | 500 | 41.7 | 1631 | 2382 | 1.46 | 38 |
| | Atomized particles (<300-mesh) at a ratio 3:1 | 1000 | 36.4 | 1882 | 2958 | 1.57 | |
| Comparison | Atomized particles (<300-mesh) | 150 | 41 | 720 | 884 | 1.23 | |
| | | 500 | 34 | 823 | 1122 | 1.36 | 31 |
| | | 1000 | 29 | 1096 | 1495 | 1.36 | |

L/D: Aspect ratio.
Strength: Breaking pressure measured by means of the Mühlen breaking test.

TABLE 2

| Filter | Type of sintered particles | Molding pressure (kg/cm²) | Porosity (%) | Pore dia. (μm) | Air flow rate (ml/min.) | Bubble point pressure (mm-H₂O) |
|---|---|---|---|---|---|---|
| A | Filaments { dia = 12 μm, L/D = 6 } | 400 | 42 | 1 | 1200 | 1250 |
| B* | Mixture of Filaments { dia = 4 μm, L/D = 6 } and Atomized particles (<300-mesh) | 400 | 42 | 0.4 | 600 | 1620 |
| C | Atomized particles (<300-mesh) | 400 | 30 | 5 | 1200 | 732 |
| D | Atomized particles (<300-mesh) | 1100 | 25 | 1 | 300 | 1108 |

Filter thickness: 0.6 mm
*Mixing ratio between filament-shaped and atomized particles is 3 to 1 in weight.

Figure 16:
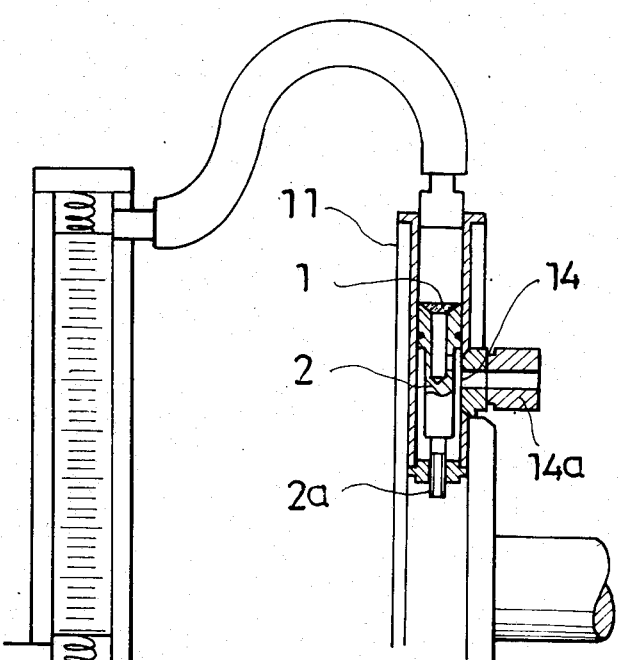
FIG. 16 shows a method of testing the air flow performance of a filter.
Figure 17:
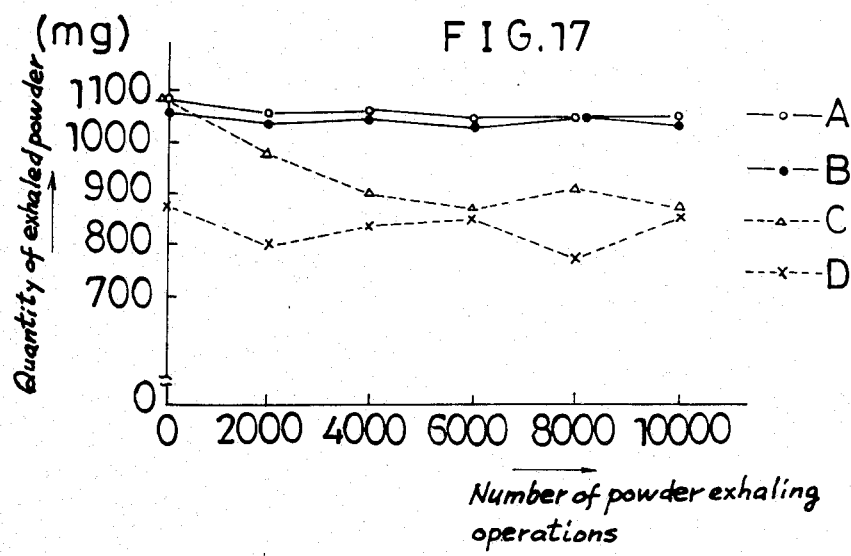
FIGS. 17 and 19 are graphical representations of experimental results on the powder exhaling characteristics of various powder-air separators.
Figure 18:
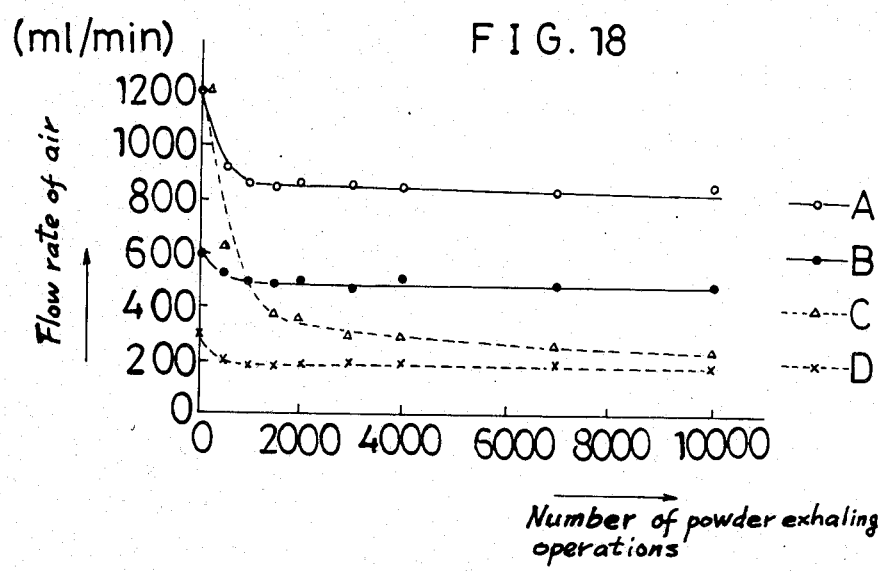
FIGS. 18 and 20 are graphical representations of experimental results on the filter clogging characteristics of various powder-air separators.

The test was made on the overall variations of powder exhaling quantity and air flow rate through the filter and on the fluctuation of powder exhaling quantity at each round of measurement by repeating powder inhaling and exhaling operations 10,000 times. Each round of powder exhaling quantity measurement consists of 10 times of powder exhaling operations. The air flow rate measurements were carried out, as is illustrated in FIG. 16, with a rotameter connected to the cylindrical hole (of the powder filling apparatus) in which a powder-air separator to be tested is inserted. The powder used in the test is a powdered pharmaceutical medicine with a low fluidity, having particle diameters of 3~5 μm, a virtual specific volume of about 4 and repose angles of 70°~80°. The frequency of powder exhaling operations is 120 times per minute. The pressure used for exhaling the powder is 1 Kg/cm², while the vacuum for inhaling the powder is −720 mm-Hg. The results of the test are shown in Table 3 and FIGS. 17 and 18.

The filters A and B have a large porosity of 42%, though their respective pore dimensions show such small values as 1 μm and 0.4 (Table 2). Therefore, they not only show relatively large air flow rates but also are hard to be clogged with powder particles. This causes the powder-air separators using the filters A and B to have an air flow enough to exhale a predetermined quantity of powder and, therefore, to show a stable power exhaling performance.

TABLE 3

| Filter | Variation of powder exhaling quantity | Fluctuation of powder exhaling quantity | Variation of air flow rate | Appraisal |
| --- | --- | --- | --- | --- |
| A | Small (Superior) | Small (Superior) | Small (Superior) | Excellent |
| B | Small (Superior) | Intermediate (Good) | Small (Superior) | Excellent |
| C | Large (Inferior) | Large (Inferior) | Large (Inferior) | Disapproved |
| D | Small { Lacking in exhaled quantity } | Large (Inferior) | Small (Superior) | Disapproved |

On the other hand, the filters C and D made only of atomized round particles have small air flow rates for their relatively large pore dimensions in comparison with the filters A and B. Although the filter C has, in the beginning, a large air flow rate of 1200 ml/min equal to that of the filter A, it shows a large decrease in the air flow rate because the large pore dimension of 5 μm causes the filter to be clogged with powder particles. In case of the filter D, the pore dimension is made small owing to a high molding pressure of 1100 Kg/cm$^2$. However, the porosity is also made small (25%) resulting in a small air flow rate of 300 ml/min, so that this filter is not suitable for dealing with a powder of low fluidity.

Figure 8:
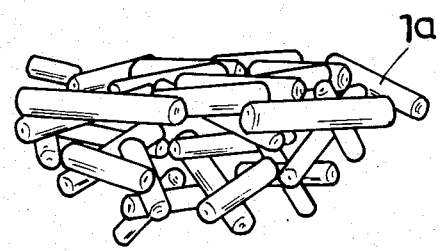
FIG. 8 and FIG. 8a shows an enlarged view illustrating the arrangement of the sintered filament-shaped particles lying in the surface region of filters based on the present invention.
Figure 9:
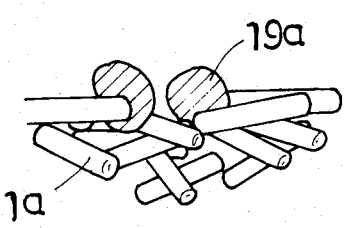
FIG. 9 shows inhaled powder particles resting in the surface pores of a filter made of sintered filament-shaped particles according to the present invention.

In case of the filters for use in the powder-air separators based on the present invention, as is shown in FIG. 8, most of the filament-shaped particles 1a lying in the surface region of the filter are oriented in parallel with the filter surface due to a molding pressure applied in advance of being sintered, forming many surface pores in a plane. In addition the surface particles receiving the molding pressure directly are not atomized (spherical) ones but filament-shaped (cylindrical) particles. Accordingly, the particles are not squeezed so strongly that the surface pores are not made bunt-shaped, being different from the pores formed on the surface of a filter made of atomized particles. This makes the filter hard to be clogged with powder particles. FIG. 9 shows that the powder particles 19a are loosely trapped in the surface pores. For the understanding of the clogging-free characteristic of the filter in the present invention, it may be helpful to compare FIGS. 8 and 9 with FIG. 27 which was referred to previously in the description of a prior art. Further, a high sintering temperature makes the surfaces of the filament-shaped particles (whose cross-sections are not always of true circle) smooth and round, causing a further increase in the clogging-free characteristic of the filter. On the other hand, the filament-shaped particles lying deep in the filter are three-dimensionally oriented. This results in a high porosity of the filter in the present invention.

Figure 8A:
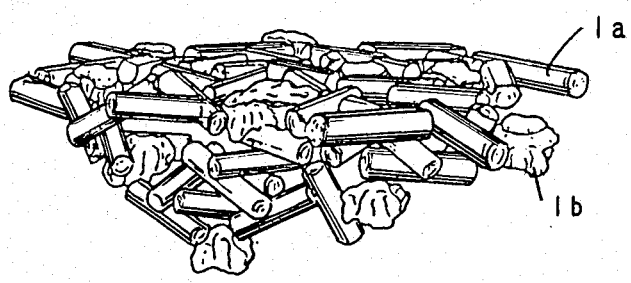

The above described clogging-free characteristic is obtained also in the filters made of a mixture of filament-shaped particles and ordinary atomized (round) particles. This embodiment is illustrated by FIG. 8a in which 1a refers to the filament-shaped particles and 1b refers to the atomized particles. However, it is important to select the dimensions (filament diameter and aspect ratio) of the filament-shaped particles and the diameter of the atomized particles to be mixed. In case of the filament-shaped particles having filament diameters not larger than 30 μm and aspect ratios of 2 to 50, it is preferable to mix the atomized particles having diameters of 10 to 500 μm at a weight percentage not larger than 90%. Mixing of atomized particles makes the particles of both kinds (filament-shaped and atomized) entangled strongly, so that the particles pressure-molded in the form of a filter are kept stable and hard to collapse even if shocks are given, for instance, in the process of being introduced into a furnace for sintering.

Some of the manners of fixing the filter 1 to the filter carrier 2 are described in the following.

In the embodiment shown in FIG. 1, the filter carrier 2 is provided with circular tenons 1a and 1b and a circular recess 1c on the top for securing the filter 1 to the filter carrier 2. The imaginary envelope surface in contact with the two tenons 1a and 1b forms a steep funnel-shaped surface lest the air flow lines through the filter 1 should leave a circular dead space on the marginal region of the filter 1. In such a structure of the top portion of the filter carrier 2, particles (filament-shaped ones or a mixture with atomized particles) are first pressure-molded in the space where the filter 1 is to be formed, and then sintered by being heated together with the filter carrier 2. By this method of sintering, the formed filter 1 is made fixed to the filter carrier 2 by burning.

Figure 22:
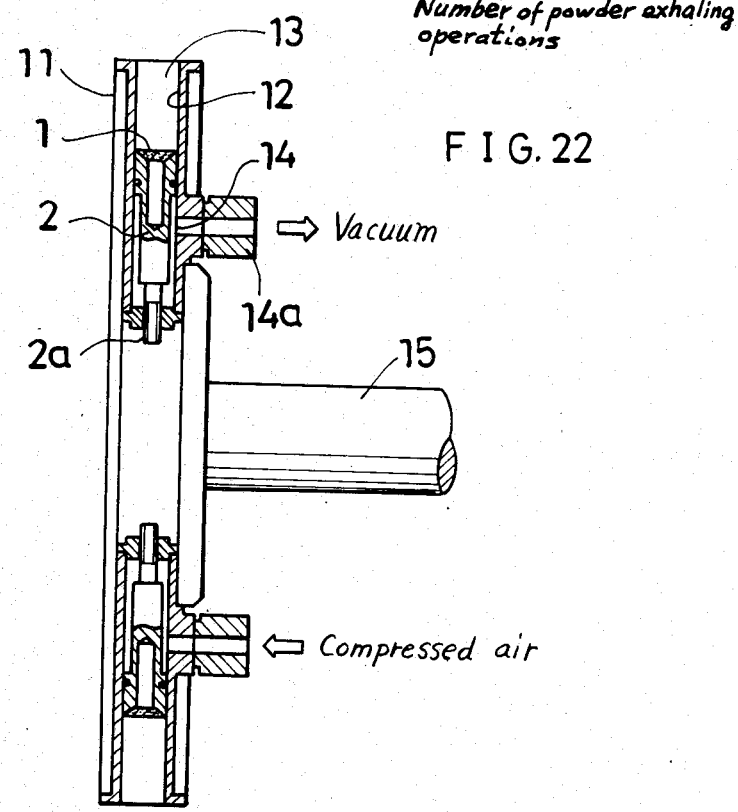
FIGS. 21 and 22 show a powder filling apparatus.
Figure 21:
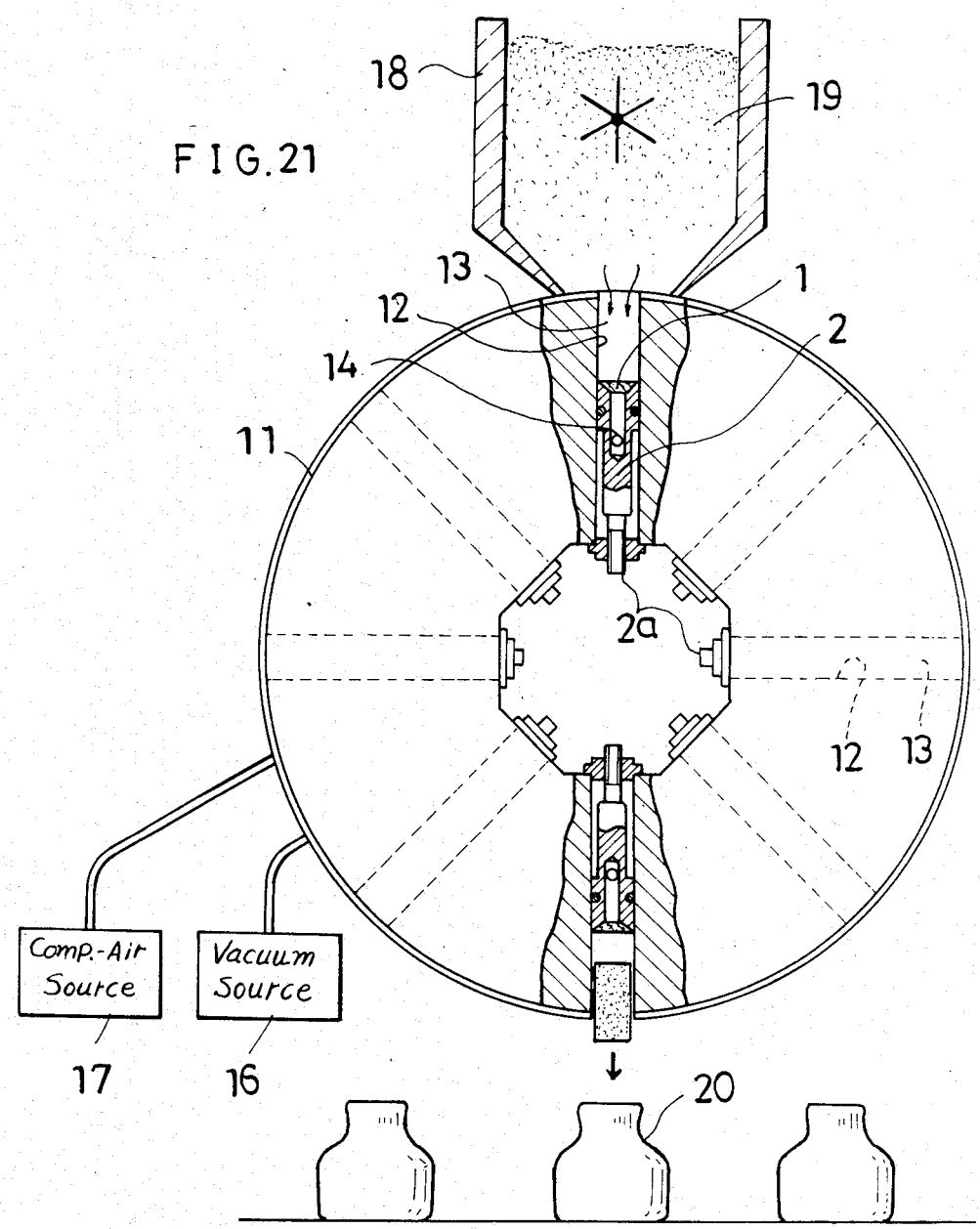

FIGS. 2 to 7 and 11 to 14 shows various embodiments of the present invention, all as being inserted in a cylindrical hole 12 of the powder filling apparatus shown in FIGS. 21 and 22. They are different from each other in the manner of fixing the filter 1 to the filter carrier 2.

Figure 2:
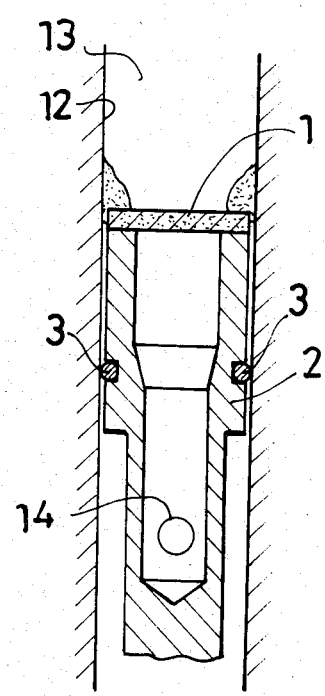

In the embodiment shown in FIG. 2, the top of the filter carrier 2 is made flat. This simple structure of the filter carrier 2 is suitable for fixing an already formed filter with an adhesive or by welding. However, the fixation with an adhesive has a disadvantage that, when the filter is subjected to sterilization treatment at a high temperature, the adhesive is liable to fall off or to lose its adhesive strength. On the other hand, the fixation by welding often causes the filter to be broken by a thermal stress. To avoid these disadvantages, the filter 1 can be fixed to the filter carrier 2 by sintering, as in the case of the embodiment of FIG. 1, together with the filter carrier 2. In this case, however, the pressure-molded particles are liable to collapse when transferred to a sintering furnace because of the simple structure of the filter fixing portion of the filter carrier 2. Anyway, this embodiment is unsuitable for treating a powder with a low fluidity, because a circular dead space for air stream lines is formed on the marginal region of the filter 1. The dead space for air stream lines causes part of a once inhaled powder to be left on the marginal region of the filter 1 when the powder is exhaled. FIG. 2 shows also the powder remaining in the powder quantity measuring chamber 13.

Figure 3:
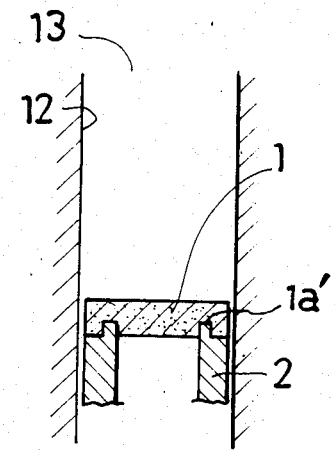

The embodiment shown in part in FIG. 3 is suitable for forming the filter 1 by sintering together with the filter carrier 2. To increase the strength of fixation, several tenons 1a' are provided on the top of the filter carrier 2. However, in case the tenons 1a' are formed as one continuous circular tenon, the dead space for air flow lines is more liable to be formed.

Figure 4:
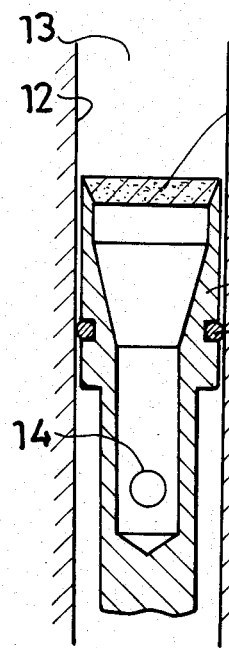

In the embodiment shown in FIG. 4, the filter carrier 2 has its top portion tapered. This structure is favorable for preventing the formation of a dead space for air flow lines, but unsuitable for forming the filter 1 by sintering together with the filter carrier 2 because the thermal contraction tendency which the sintered filter shows when it is cooled weakens the strength of fixation.

Figure 5:
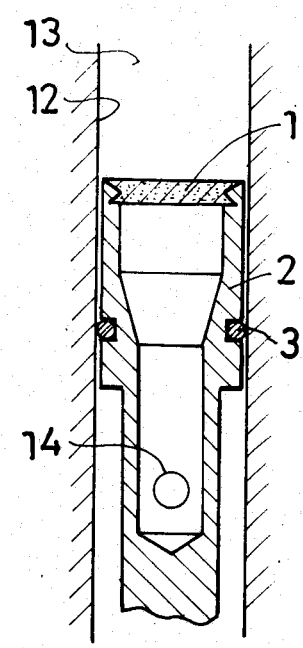

The embodiment shown in FIG. 5 is devised to be free from the disadvantage accompanied by the embodiment shown in FIG. 4. The filter carrier 2 is provided with a tenon along the inside wall of the same.

Figure 6:
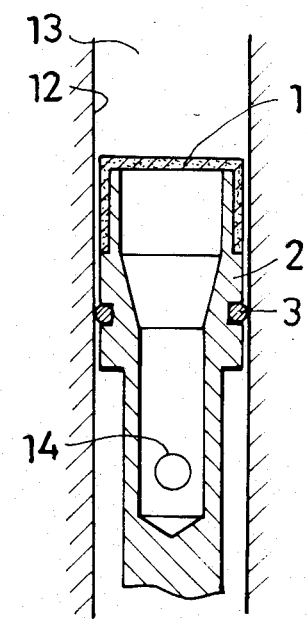

In the embodiment shown in FIG. 6, the filter 1 is cap-shaped. This structure is suitable for forming the filter by sintering together with the filter carrier 2.

Figure 7:
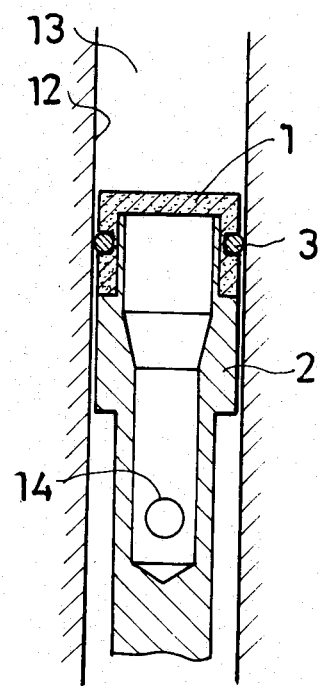

The embodiment shown in FIG. 7 has a structure similar to that of the embodiment shown in FIG. 6 except that the O-ring 3 is provided near the top of the powder-air separator to prevent a inhaled powder from falling down deep in the clearance between the cylindrical hole 2 and the filter carrier 2. In general, a sintered filter lacks in its demensional accuracy, and therefore an inhaled powder is liable to fall down into the clearance the cylindrical hole 12 and the filter carrier 2. This embodiment is devised to avoid such disadvantage.

Figure 10:
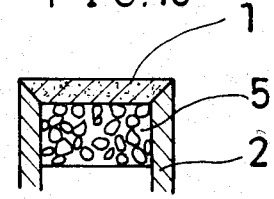
FIG. 10 shows a method of reinforcing a filter.

In all of the above described embodiments, the sinter filter 1 can be reinforced, as is schematically illustrated in FIG. 10, with an air-pervious material 5. Application of such reinforcing measures also increases the strength of fixation of the filter to the filter carrier.

The embodiments shown FIGS. 11 to 14 are devised lest the air flow lines should form a dead space.

Figure 11:
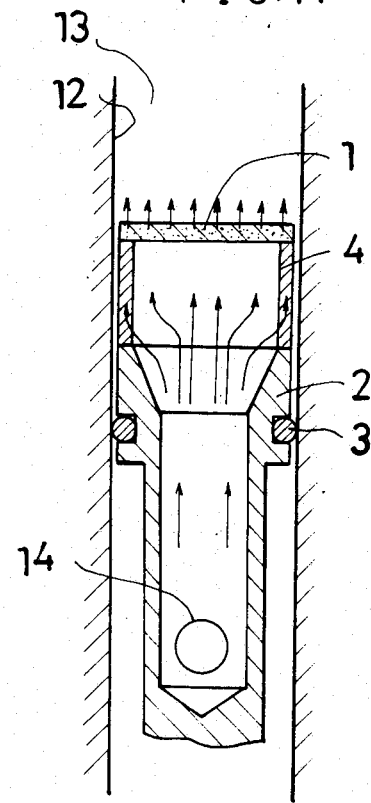
Figure 15:
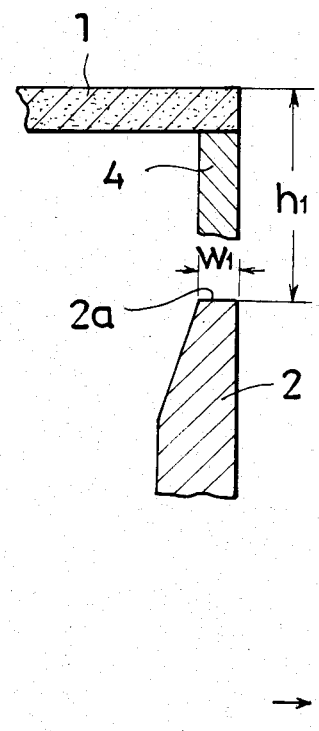
FIG. 15 shows a filter fixing manner for making powder exhaling air pass through a filter without leaving a dead space on the marginal region of the filter.

In the embodiment shown in FIG. 11, the filter 1 is fixed to the filter carrier 2 with an air-pervious support 4 inserted between the two. Air flows as indicated with arrows, making no dead space. In this case, the dimensional relation between the wall thickness on top of the filter carrier 2 and the height of the top surface of the filter 1 is illustrated in FIG. 15. It is preferable to choose $h_1/W_1 \geq 1$.

In the embodiment shown in FIG. 12, the filter is made cap-shaped. The cylindrical portion 4 of the cap-shaped filter 1 serves as an air-pervious support 4.

The structure of the embodiment shown in FIG. 13 is suitable when the filter 1 is made thin. The filter 1 is reinforced with an air-pervious reinforcing element 5. Air can flow substantially freely spreading in the air-pervious reinforcing element 5, and therefore no dead space for air flow lines is formed.

The embodiment shown in FIG. 14 is similar to the embodiment shown in FIG. 13 excepting that the filter 1 in this embodiment is not cup-shaped but disc-shaped.

As is understood from the above descriptions, the embodiments shown in FIGS. 11 to 14 are made free from the problem of the dead space for air flow lines. However, when an inhaled power is exhaled, the powder spilt in the clearance is also exhaled sporadically, because the exhaling air passes also through the side wall of the air-pervious element. Therefore, it is preferable to fill up or clog the surface pores facing the wall of the cylindrical hole 12 by machining or by applying a coating material or a thin film.

Experimental results on the powder exhaling performance of various powder-air separators are described in the following.

The powder exhaling performance was observed with a VTR about the powder-air separators shown in FIGS. 12, 23, 24 and 25 with these separators applied, as is shown in FIGS. 12A, 23A, 24A and 25A, to the powder filling apparatus of FIG. 21 (FIG. 22). The separators other than that shown in FIG. 12 (FIG. 12A) are prior art ones. In FIGS. 23A, 24A and 25A, crosshatched circles shows the effective air-through areas of the filters. The powder used in the experiment is a low fluidity powdered pharmaceutical medicine having particle diameters of 3 to 5 μm, a vertual specific gravity of 4.0 and showing repose angles of 70° to 80°. The frequency of powder exhaling operation is 120 times/min. The pressure used for exhaling the powder is 1 Kg/cm², while the vacuum for inhaling the powder is −720 mm-Hg. Table 4 shows the results.

TABLE 4

| Separator shown in: | Exhaling performance | Powder residual in the chamber 13 |
|---|---|---|
| FIG. 12(12A) | Excellent | no. |
| FIG. 24(24A) | Powder spilt out sporadically | in the dead space area |
| FIG. 25(25A) | Powder spilt out sporadically | on the tapered portion |
| FIG. 23(23A) | Powder spilt out sporadically | small quantity |

In the next place a similar experiment was carried out on the following filters:

Filter E: the filter in FIG. 12 (12A) with the side surface machined.
Filter F: the filter in FIG. 12 (12A) with the side surface not machined.
Filter G: the filter in FIG. 26 (26A) with the side surface machined. (In FIG. 26A the crosshatched circle shows the effective air-through area of the filter)
Filter H: the filter in FIG. 26 (26A) with the side surface not machined.

The results are shown in Table 5.

TABLE 5

| Filter | Powder exhaling performance |
|---|---|
| E | Excellent |
| F | Powder scattering observed |
| G | Excellent |
| H | Powder scattering observed |

Finally an experiment was carried out on overall variations of powder exhaling quantity and air flow rate through the filter and on the fluctuation of powder exhaling quantity at each round of measurement by repeating powder inhaling and exhaling operations 10,000 times. In this experiment the five kinds of filters shown in Table 6 were used. The results are shown in Table 7.

TABLE 6

| Filter | Pore dimension, Structure |
|---|---|
| E | Filter in FIG. 12(12A). Average pore dia. is 0.6 μm. Side surface machined. |
| F | Filter E with side surface not machined. |
| I | Filter in FIG. 23(23A). Pore dimension = large. |
| G | Filter in FIG. 26(26A). Thick. Average pore dia. is 5 μm. Side surface machined. |
| J | Filter in FIG. 26(26A). Thick. |

TABLE 6-continued

| Filter | Pore dimension, Structure |
|---|---|
| | Average pore dia. is 0.6 μm. Side surface machined. |

TABLE 7

| Filter | Variation of powder exhaling quantity | Fluctuation of powder exhaling quantity at each round of measurement | Powder exhaling performance | Variation of air flow rate | Appraisal |
|---|---|---|---|---|---|
| E | Small (Excellent) | Small (Excellent) | Excellent | Small (Excellent) | Excellent |
| F | Small (Excellent) | Intermediate (Good) | Powder scattering | Small (Excellent) | Good |
| I | Large (Disapproved) | Large (Disapproved) | Powder scattering | Large (Disapproved) | Disapproved |
| G | Large (Disapproved) | Large (Disapproved) | Powder scattering | Large (Disapproved) | Disapproved |
| J | Small (Excellent) | Large (Disapproved) | Powder scattering | Small (Excellent) | Disapproved |

Figure 19:
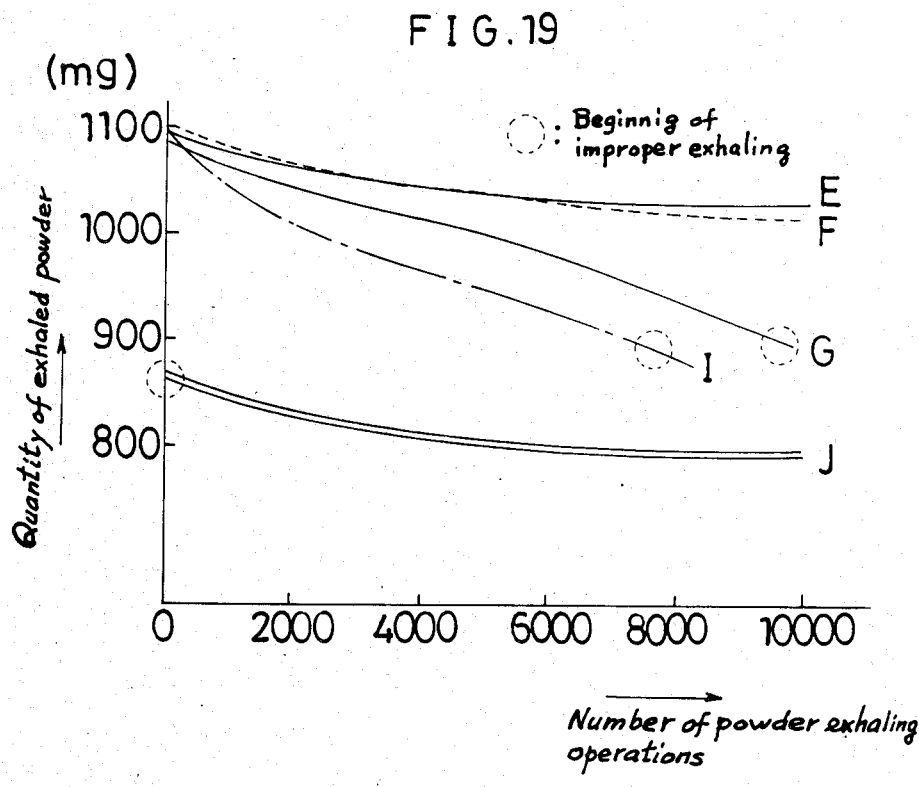
Figure 20:
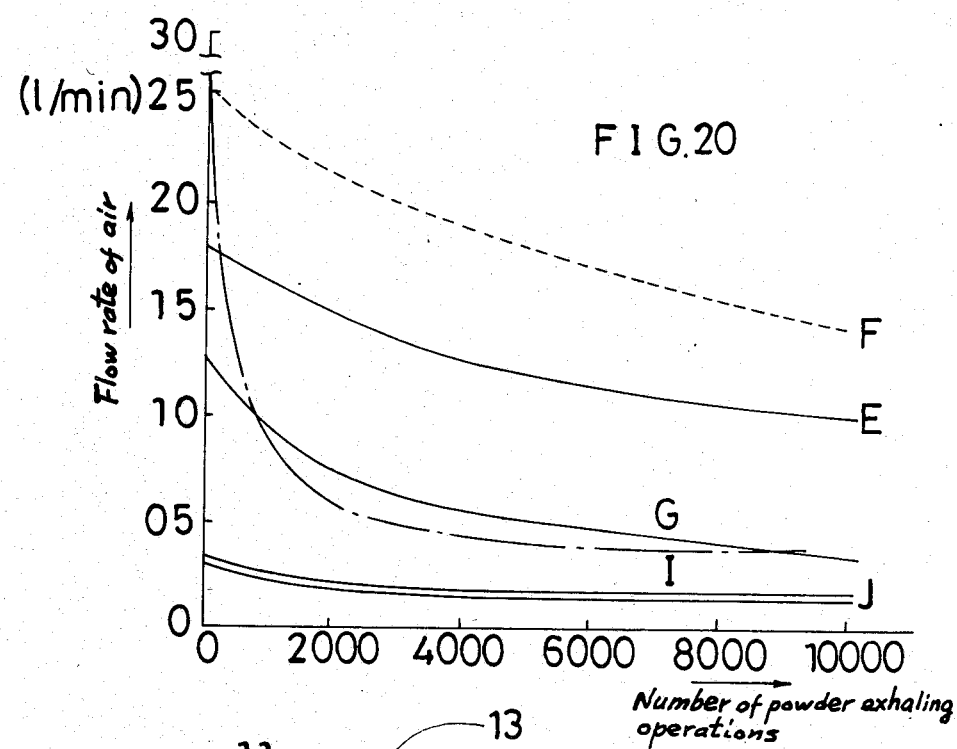

As is understood more readily from a FIGS. 19 and 20, the filters E, F, and J show small decreases in both the quality of exhaled powder and the flow rate of air, depending on the increase of the number of powder exhaling operations. However, the filter F, whose side surface is not machined, shows a somewhat large fluctuation in the powder exhaling quantity at each round (Table 7). The filters I and G show large decreases in the flow rate of air due to the pore cloggings and, therefore, in the powder inhaling powder, as the number of powder exhaling operations reaches 10,000 times. In consideration of these and other results shown in Table 7, FIGS. 19 and 20, it can be concluded that the powder-air separators shown in FIGS. 11 to 14 are excellent.

We claim:

1. A powder-air separator for use in a powder filling apparatus for measuring a predetermined quantity of powder into a vessel by first inhaling powder from a powder supply source into a powder quantity measuring chamber provided in the apparatus and then exhaling the powder into a vessel to be charged with the powder, said powder-air separator comprising:

a powder-air separating filter, said filter including sintered fine particles a substantial portion of which consist of short-cut filament-shaped particles having filament diameters not larger than 30 micrometers and aspect ratios of 2 to 50, said powder-air separating filter having a porosity not less than 30% and showing an initial bubble point pressure not lower than 1200 mm-$H_2O$; and a hollow cylindrical filter carrier on which said powder-air separating filter is fixed to form said powder-air separator as a whole.

2. A powder-air separator as defined in claim 1, wherein said sintered fine particles consist only of said short-cut filament-shaped particles.

3. A powder-air separator as defined in claim 1, wherein said sintered fine particles include atomized spherical particles having diameters not larger than 500 micrometers.

4. A powder-air separator as defined in claim 1, wherein said powder-air separating filter and said hollow cylindrical filter carrier are fixed to each other with an air-pervious material laid between them.

5. A powder-air separator defined in claim 2, wherein said powder-air separating filter and said hollow cylindrical filter carrier are fixed to each other with an air-pervious material laid between them.

6. A powder-air separator defined in claim 3, wherein said powder-air separating filter and said hollow cylindrical filter carrier are fixed to each other with an air-pervious material laid between them.

* * * * *